(12) United States Patent
Takamori et al.

(10) Patent No.: US 11,718,958 B2
(45) Date of Patent: Aug. 8, 2023

(54) SHOE PRESS BELT AND METHOD FOR PRODUCING A SHOE PRESS BELT

(71) Applicant: Ichikawa Co., Ltd., Tokyo (JP)

(72) Inventors: Yuya Takamori, Tokyo (JP); Manami Morinaga, Tokyo (JP)

(73) Assignee: Ichikawa Co., Ltd., Tokyo (JP)

(*) Notice: Subject to any disclaimer, the term of this patent is extended or adjusted under 35 U.S.C. 154(b) by 212 days.

(21) Appl. No.: 17/178,328

(22) Filed: Feb. 18, 2021

(65) Prior Publication Data

US 2021/0269978 A1 Sep. 2, 2021

(30) Foreign Application Priority Data

Feb. 28, 2020 (JP) ................................. 2020-033893

(51) Int. Cl.
*D21F 3/02* (2006.01)
*C08G 18/10* (2006.01)
(Continued)

(52) U.S. Cl.
CPC ........... *D21F 3/0236* (2013.01); *C08G 18/10* (2013.01); *C08G 18/44* (2013.01);
(Continued)

(58) Field of Classification Search
CPC ...... D21F 3/0236; D21F 3/086; D21F 3/0227; C08G 18/10; C08G 18/44; C08G 18/4854; C08G 18/7671; C08G 18/3206
See application file for complete search history.

(56) References Cited

U.S. PATENT DOCUMENTS

| 10,196,777 B2* | 2/2019 | Umehara | D21F 3/0227 |
| 2006/0191658 A1* | 8/2006 | Watanabe | C08G 18/10 |
| | | | 162/358.4 |

(Continued)

FOREIGN PATENT DOCUMENTS

| EP | 3 282 052 A1 | 2/2018 |
| JP | 2016-199813 A | 12/2016 |

(Continued)

OTHER PUBLICATIONS

Extended European Search Report dated Aug. 6, 2021 in European Patent Application No. 21156906.6, 7 pages.

*Primary Examiner* — Eric Hug
*Assistant Examiner* — Matthew M Eslami
(74) *Attorney, Agent, or Firm* — Oblon, McClelland, Maier & Neustadt, L.L.P.

(57) ABSTRACT

The object of the invention is to provide a shoe press belt which has an excellent strength while the variation in strength among its parts being suppressed, and to provide a method for producing such a shoe press belt.
Provided is a shoe press belt for use in a papermaking machine comprising at least one resin layer, wherein the resin layer comprises a polyurethane resin formed by curing an urethane prepolymer having an isocyanate group with a curing agent having an active hydrogen group, wherein the curing agent comprises one or more polycarbonate diol(s) expressed by the following formulae (1) and (2).

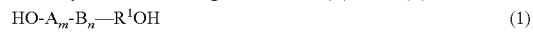

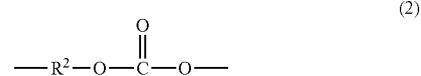

11 Claims, 5 Drawing Sheets

(51) Int. Cl.
   *C08G 18/44*   (2006.01)
   *C08G 18/48*   (2006.01)
   *C08G 64/30*   (2006.01)
   *C08K 5/00*    (2006.01)
   *C08K 5/053*   (2006.01)
   *D21F 3/08*    (2006.01)

(52) U.S. Cl.
   CPC ....... *C08G 18/4854* (2013.01); *C08G 64/305* (2013.01); *C08K 5/0025* (2013.01); *C08K 5/053* (2013.01); *D21F 3/086* (2013.01)

(56) References Cited

U.S. PATENT DOCUMENTS

2014/0352904 A1* 12/2014 Singh ................. C08G 18/7671
                                                                525/467
2016/0355978 A1* 12/2016 Takamori ................ D21F 3/029
2018/0094385 A1    4/2018 Hikida

FOREIGN PATENT DOCUMENTS

WO   WO 2013/013891 A    1/2013
WO   WO 2013/122812 A1   8/2013

* cited by examiner

SHOE PRESS BELT AND METHOD FOR PRODUCING A SHOE PRESS BELT

CROSS REFERENCE TO RELATED APPLICATIONS

This application is based upon and claims benefit of priority from Japanese Patent Application No. 2020-033893, filed on Feb. 28, 2020, the entire contents of which are incorporated herein by reference.

BACKGROUND

Technical Field

The present invention relates to a shoe press belt and a method for producing a shoe press belt.

Background Art

Papermaking machines for removing moisture from a source material of paper are generally equipped with a wire part, a press part, and a dryer part. These parts are arranged in the order of the wire part, the press part, and the dryer part in a wet paper web transfer direction.

A wet paper web is transferred and moisture thereof is removed while the wet paper web is being successively passed through papermaking devices provided in the wire part, the press part, and the dryer part, and the wet paper web is finally dried in the dryer part. In those parts, the papermaking devices corresponding to a function of dehydrating a wet paper web (wire part), a function of squeezing water (press part), and a function of drying the wet paper web (dryer part) are used.

The press part generally comprises one or more press devices arranged in series in the wet paper web transfer direction. An endless felt is disposed in each press device, or an endless felt formed by connecting an ended felt on a papermaking machine is disposed therein. In addition, each press device has a roll press mechanism made up of a pair of rolls facing each other or a shoe press mechanism in which an endless shoe press belt is interposed between a recessed shoe facing a roll and the roll. The felt, on which the wet paper web is placed, is passed through the roll press mechanism or the shoe press mechanism and pressurized while moving the felt in the wet paper web transfer direction, and thereby moisture of the wet paper web is continuously squeezed from the wet paper web by being absorbed into the felt or by passing moisture through the felt to discharge the moisture to the outside.

In the shoe press belt, a reinforcement material is embedded in resin and the resin constitutes an outer circumferential layer, which is brought into contact with the felt, and an inner circumferential layer, which is in contact with the shoe. In addition, the shoe press belt repeatedly travels between the pressurized roll and the shoe, and therefore the resin of the shoe press belt is required to have an excellent durability.

JP 2016-199813 A proposes a shoe-pressing belt composed of a polyurethane and a reinforcing substrate embedded in the polyurethane such that the polyurethane and the reinforcing substrate are integrated, for the purpose of, in a shoe press belt having a drain, preventing the collapse or impairment of a land or even occurrences of cracks in the land that constitutes the drain, wherein the polyurethane that constitutes at least an outer circumferential surface of the shoe-pressing belt is a thermosetting polyurethane obtained by curing an urethane prepolymer with a curing agent, and wherein the urethane prepolymer comprises a first urethane prepolymer obtained by a reaction of a polyol ingredient containing a given linear aliphatic polycarbonate diol with an aromatic diisocyanate.

SUMMARY

Technical Problem

A shoe press belt provided with a polyurethane layer having linear aliphatic polycarbonate diol as a component of urethane prepolymer is excellent in its strength. On the other hand, the present inventors found that, when linear aliphatic polycarbonate diol was used as a component of an urethane prepolymer, the resulting shoe press belt had variation in strength among the parts of it. The presence of variation in strength among the parts of a shoe press belt may cause a damage or deterioration to the shoe press belt starting from the part with weak strength, which would as a result cause difficulty in improving durability of the shoe press belt.

Accordingly, an object of the present invention is to provide a shoe press belt which has an excellent strength while the variation in strength among its parts being suppressed, and to provide a method for producing such a shoe press belt.

Solution to Problem

The present inventors have made intensive studies in order to achieve the aforementioned object and as a result found that, in a shoe press belt, by combining particular polycarbonate diol in the curing agent, the strength of a polyurethane layer constituting the shoe press belt could be increased while suppressing the variation in strength, and thus accomplished the present invention.

A gist of the present invention is as follows:

[1] A shoe press belt for use in a papermaking machine, comprising at least one resin layer, wherein:
the resin layer comprises a polyurethane resin formed by curing an urethane prepolymer having an isocyanate group with a curing agent having an active hydrogen group, wherein:
the curing agent comprises one or more polycarbonate diol(s) expressed by the following formula (1):

wherein:
in the formula (1),
A and B are each differently a unit expressed by the following formula (2):

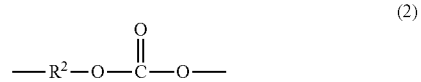

$R^1$ is a linear, branched or cyclic alkylene group having 1 or more and 20 or less of (a) carbon atom(s),
m and n are each independently an integer from 1 to 46, and in the formula (2),
$R^2$ is a linear alkylene group having 1 or more and 20 or less of (a) carbon atom(s).

[2] The shoe press belt according to [1], wherein the absolute difference between the number of carbon atoms contained in A and the number of carbon atoms contained in B in the formula (1) is 1 or more and 8 or less.

[3] The shoe press belt according to [1] or [2], wherein the number of carbon atoms of $R^2$ in A is 2 or more and 11 or less, and the number of carbon atoms of $R^2$ in B is 3 or more and 19 or less.

[4] The shoe press belt according to any one of [1] to [3], wherein
$R^2$ in A is n-propylene group, and $R^2$ in B is n-butylene group; or
$R^2$ in A is n-butylene group, and $R^2$ in B is n-hexylene group or n-decylene group; or
$R^2$ in A is n-pentylene group, and $R^2$ in B is n-hexylene group; or
$R^2$ in A is n-hexylene group, and $R^2$ in B is n-undecylene group or n-dodecylene group; or
$R^2$ in A is n-undecylene group, and $R^2$ in B is n-dodecylene group.

[5] The shoe press belt according to any one of [1] to [4], comprising as the resin layer a layer which constitutes an outer circumferential surface of the shoe press belt and comprises the polyurethane resin.

[6] The shoe press belt according to any one of [1] to [5], comprising as the resin layer a layer which constitutes the inner circumferential surface of the shoe press belt and comprises the polyurethane resin.

[7] A method for producing a shoe press belt for use in a papermaking machine,
the method comprising a step of forming a resin layer by curing an urethane prepolymer having an isocyanate group with a curing agent having an active hydrogen group, wherein:
the curing agent comprises one or more polycarbonate diol(s) expressed by the following formula (1):

$$\text{HO-A}_m\text{-B}_n\text{—R}^1\text{OH} \quad (1)$$

wherein:
in the formula (1),
A and B are each differently a unit expressed by the following formula (2):

(2)

$R^1$ is a linear, branched or cyclic alkylene group having 1 or more and 20 or less of (a) carbon atom(s),
m and n are each independently an integer from 1 to 46, and in the formula (2),
$R^2$ is a linear alkylene group having 1 or more and 20 or less of (a) carbon atom(s).

Advantageous Effects of Invention

The above-mentioned configuration makes it possible to provide a shoe press belt having an excellent strength while suppressing the variation in strength among its parts, and to provide a method for producing such shoe press belt.

DESCRIPTION OF THE EMBODIMENTS

Hereinafter, referring to the appended drawings, preferred embodiments of a shoe press belt and a method for producing a shoe press belt according to the present invention will be described in detail.

<1. Shoe Press Belt>

First, a shoe press belt according to a preferred embodiment of the present invention will be described.

Figure 1:
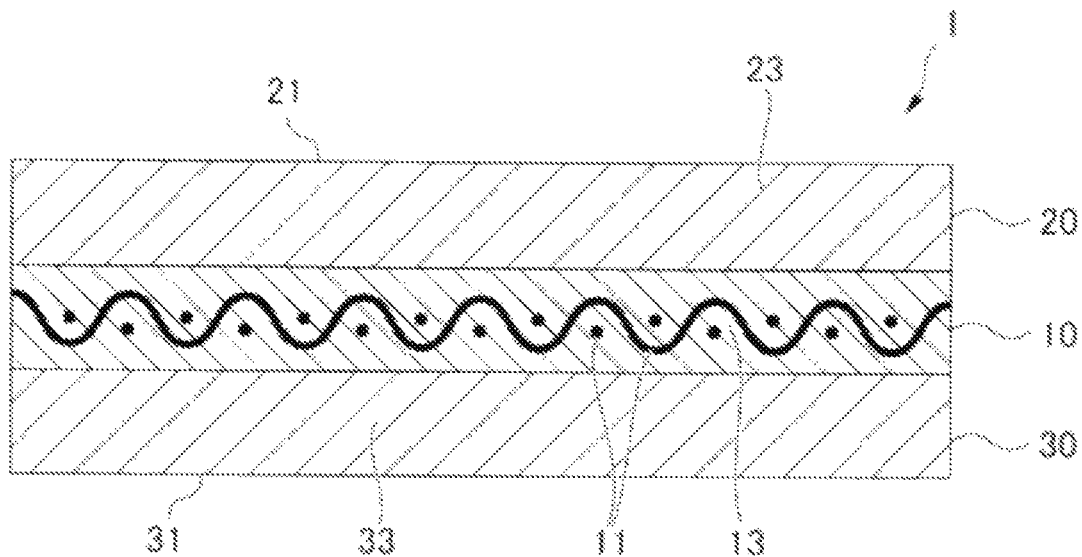
FIG. 1 is a cross-sectional view in a cross machine direction showing a shoe press belt according to an embodiment of the present invention.

FIG. 1 is a cross-sectional view in a cross machine direction showing an example of a shoe press belt according to a preferred embodiment of the present invention. Note that, in the drawing, each member has been emphasized in size as appropriate for ease of illustration and thus does not indicate the actual proportion and size of each member. Herein, the aforementioned cross machine direction may be referred to as "CMD", and the machine direction may be referred to as "MD".

A shoe press belt 1 shown in FIG. 1 is used for transferring a wet paper web in cooperation with a felt in a press part, more specifically in a shoe press mechanism, of a papermaking machine and squeezing moisture from the wet paper web. The shoe press belt 1 forms an endless band-shaped body. That is, the shoe press belt 1 is an annular belt. In addition, a circumferential direction of the shoe press belt 1 is generally disposed along a machine direction (MD) of the papermaking machine.

The shoe press belt 1 shown in FIG. 1 comprises a reinforcing fibrous substrate layer 10, a first resin layer 20 provided on one principal surface on an outer surface side of the reinforcing fibrous substrate layer 10, and a second resin layer 30 provided on the other principal surface on an inner surface side of the reinforcing fibrous substrate layer 10, and the shoe press belt 1 is formed by laminating those layers.

The reinforcing fibrous substrate layer 10 comprises a reinforcing fibrous substrate 11 and resin 13. The resin 13 exists in the reinforcing fibrous substrate layer 10 so as to fill gaps between fibers in the reinforcing fibrous substrate 11. That is, the reinforcing fibrous substrate 11 is impregnated with a part of the resin 13, and the reinforcing fibrous substrate 11 is embedded in the resin 13.

There are no particular limitations with regard to the reinforcing fibrous substrate 11. However, for example, fabrics woven by a weaving machine and the like from warps and weft yarns are commonly used. Moreover, it is also possible to use a grid-like web material of superimposed rows of warps and weft yarns without weaving. Alternatively, two or more of woven fabrics and grid-like web materials, etc. can be used in combination.

There are no particular limitations with regard to the fineness of the fibers constituting the reinforcing fibrous substrate 11. However, for example, the fineness can be set to 300 to 10,000 dtex and can preferably be set to 500 to 6,000 dtex.

Moreover, the fineness of the fibers constituting the reinforcing fibrous substrate 11 may be different depending on a part in which the fibers are used. For example, the fineness of the warps and weft yarns in the reinforcing fibrous substrate 11 may be different.

As a material of the reinforcing fibrous substrate 11, it is possible to use one or a combination of two or more of polyesters (polyethylene terephthalate, polybutylene terephthalate, and the like), aliphatic polyamides (polyamide 6, polyamide 11, polyamide 12, polyamide 612, and the like), aromatic polyamides (aramid), polyvinylidene fluoride, polypropylene, polyether ether ketone, polytetrafluoroethylene, polyethylene, wool, cotton, metals, and the like.

The resin 13 will be described hereinafter.

The first resin layer 20 is a resin layer provided on one principal surface on the outer surface side of the reinforcing fibrous substrate layer 10, and is composed of resin 23. The first resin layer 20 constitutes the outer circumferential surface 21. When the shoe press belt 1 is used, an wet paper web is supported and carried with a felt on the outer circumferential surface 21.

The second resin layer 30 is a resin layer provided on the other principal surface on the inner surface side of the reinforcing fibrous substrate layer 10, and is composed of resin 33. The second resin layer 30 constitutes the inner circumferential surface 31. When the shoe press belt 1 is used, the inner circumferential surface 31 is disposed such that it is in contact with a shoe of the shoe press mechanism (not illustrated).

Next, the resin 13 in the reinforcing fibrous substrate layer 10, the resin 23 of the first resin layer 20, and the resin 33 which constitutes the second resin layer 30 of the shoe press belt 1 are described.

In embodiments of the present invention, at least one resin layer of the reinforcing fibrous substrate layer 10, the first resin layer 20 and the second resin layer 30 of the shoe press belt 1 comprises a polyurethane formed by curing a urethane prepolymer having an isocyanate group with a curing agent having an active hydrogen group, wherein:

the curing agent comprises one or more polycarbonate diol(s) Y expressed by the following formula (1):

$$HO\text{-}A_m\text{-}B_n\text{—}R^1OH \quad (1)$$

wherein:
in the formula (1),
A and B are each differently a unit expressed by the following formula (2):

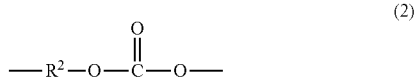

$$\text{—}R^2\text{—}O\text{—}\overset{\overset{\displaystyle O}{\|}}{C}\text{—}O\text{—} \quad (2)$$

$R^1$ is a linear, branched or cyclic alkylene group having 1 or more and 20 or less of (a) carbon atom(s),
m and n are each independently an integer from 1 to 46, and in the formula (2),
$R^2$ is a linear alkylene group having 1 or more and 20 or less of (a) carbon atom(s).

Since the constitution of the resin 13, resin 23 and resin 33 can be considered to be similar, the resin 23 of the first resin layer 20 will be described in detail hereinbelow as a representative. In the description below, a case will be principally described in which the resin 23 comprises a polyurethane resin comprising the polycarbonate diol Y as a component of the curing agent.

The polyurethane resin which constitutes the resin 23 comprises the above-described polycarbonate diol Y as a component of the curing agent. This suppresses the variation in strength in the first resin layer 20 composed of the resin 23 and improves the strength of the first resin layer 20 at the same time, and as a result suppresses the variation in strength among the parts of the shoe press belt 1 and improves the strength of the shoe press belt at the same time.

In detail, a polyurethane layer having a linear aliphatic polycarbonate diol as a component of an urethane prepolymer is excellent in its strength. On the other hand, the present inventors found that, when a linear aliphatic polycarbonate diol was used as a component of an urethane prepolymer, the resulting shoe press belt had variation in strength among the parts of it. The presence of variation in strength among the parts of the shoe press belt may cause a damage or deterioration to the shoe press belt starting from the part with weak strength, which as a result would cause difficulty in improving durability of the shoe press belt.

Accordingly, the present inventors have made intensive studies in order to elucidate the reason therefor and as a result found that, when a linear aliphatic polycarbonate diol is used to prepare an urethane prepolymer, the viscosity of both the urethane prepolymer and of the urethane composition prepared by mixing a curing agent and the urethane prepolymer would be greatly increased, making it difficult to uniformly discharge and apply the urethane composition at the time of producing a shoe press belt. In this case, it is difficult to form an uniform polyurethane layer.

On the other hand, the present inventors have found that, when a curing agent comprising the above-described polycarbonate diol Y is used, the increase in viscosity of the resulting urethane composition can be suppressed, and an uniform polyurethane resin layer can be formed. It was also found that, in a resin layer thus formed by using a curing agent comprising the polycarbonate diol Y, not only variation in strength among the parts in the shoe press belt is suppressed, but also the strength of the shoe press belt as a whole is improved.

In the present specification, unless otherwise stated, "among the parts" refers to the relation between arbitrary parts in surface direction of a resin layer which constitutes a shoe press belt, i.e., a resin layer which is formed by the same material. For instance, in the shoe press belt 1 according to the present embodiment, for each of the reinforcing fibrous substrate layer 10, the first resin layer 20 and the second resin layer 30, arbitrary parts in each resin layer in surface direction can be compared. Moreover, the variation in strength among the parts in each resin layer has multiple influences on the shoe press belt, causing the variation in strength among the parts in entire shoe press belt.

In detail, the above-described polycarbonate diol Y is a copolymer which comprises two or more different linear alkylene groups as monomers. When different linear alkylene groups are present in the principal chain of a polymer, crystallinity of the polycarbonate diol itself will be decreased as compared to a polycarbonate diol composed of single linear alkylene group. That is, the affinity between the polycarbonate diol molecules is relatively low. Therefore, the increase in viscosity of an urethane composition will be suppressed when the urethane composition is prepared by mixing a curing agent and an urethane prepolymer.

Moreover, in the present invention, the curing agent comprises the polycarbonate diol(s) Y described above. When the polycarbonate diol Y is used as a component of an urethane prepolymer, viscosity of the reaction solution will be increased at the time of synthesizing the urethane prepolymer. In this case, it is difficult to uniformly mix the urethane prepolymer and the curing agent, and the resulting urethane composition will have large ununiformity. On the other hand, in the present invention, by including the polycarbonate diol Y described above in the curing agent, it is no longer necessary to include the polycarbonate diol Y in the urethane prepolymer, resulting in an uniform composition of the urethane prepolymer while suppressing the increase in viscosity of the urethane prepolymer. Furthermore, the urethane prepolymer and the curing agent will be mixed relatively uniformly by mixing the the urethane prepolymer in which the increase in viscosity is suppressed with the curing agent, giving a relatively uniform urethane composition in which he increase in viscosity is suppressed. In the present embodiments, this will suppress the variation in strength between the parts of the urethane resin layer, i.e., the first resin layer 20.

Moreover, by including a polycarbonate diol Y described above in the curing agent, the strength of the formed urethane resin layer, i.e., the first resin layer 20, will be improved.

In particular, the first resin layer 20 constitutes the outer circumferential surface 21 of the shoe press belt 1. In the shoe press belt 1, the outer circumferential surface 21 is a part which is prone to coming into contact/friction with a felt, etc., associated wearing of the shoe press belt 1, and damages (e.g., cracks) due to bending fatigue of the shoe press belt 1. Accordingly, the durability of the shoe press belt 1 is improved by including a polyurethane resin formed by using the curing agent comprising the polycarbonate diol Y in the first resin layer 20 that constitutes the outer circumferential surface 21 of the shoe press belt 1.

In the above-described formula (1), A and B are each differently a group expressed by the formula (2). In the formula (2), $R^2$ includes, for example, a methylene group, ethylene group, n-propylene group, n-butylene group, n-pentylene group, n-hexylene group, n-heptylene group and n-octylene group, n-nonylene group, n-decylene group, n-undecylene group, n-dodecylene group, n-tridecylene group, n-tetradecylene group, n-pentadecylene group, n-hexadecylene group, n-heptadecylene group, n-octadecylene group, n-nonadecylene group and n-icosylene group, and the like.

Among those mentioned above, $R^2$ in A is preferably a linear alkylene group having 2 or more and 18 or less carbon atoms, more preferably a linear alkylene group having 3 or more and 11 or less carbon atoms. Similarly, $R^2$ in B is preferably a linear alkylene group having 3 or more and 19 or less carbon atoms, more preferably a linear alkylene group having 4 or more and 12 or less carbon atoms. In general, when $R^2$ is a linear alkylene group, viscosity of the urethane composition tends to be increased. However, in the present embodiment, the increase in viscosity of the urethane composition is also suppressed by the presence of different $R^2$ in A and B and by using polycarbonate diol Y as the curing agent. On the other hand, because $R^2$ is linear alkylene group, the strength of the resulting first resin layer 20 is further improved.

Because A and B are different, $R^2$ in A and B are naturally different. Here, the absolute difference between the number of carbon atoms contained in A and the number of carbon atoms contained in B is, for example, 1 or more and 8 or less, preferably 1 or more and 6 or less.

Preferably, the number of carbon atoms of $R^2$ in A is 2 or more and 18 or less, and the number of carbon atoms of $R^2$ in B is 3 or more and 19 or less. More preferably, the number of carbon atoms of $R^2$ in A is 2 or more and 11 or less, and the number of carbon atoms of $R^2$ in B is 3 or more and 19 or less. Further preferably, the number of carbon atoms of $R^2$ in A is 2 or more and 11 or less, and the number of carbon atoms of $R^2$ in B is 4 or more and 12 or less. Particularly preferably, the number of carbon atoms of $R^2$ in A is 3 or more and 11 or less, and the number of carbon atoms of $R^2$ in B is 4 or more and 12 or less.

In particular, preferred combinations of A and B are listed below:

$R^2$ in A is n-propylene group, and $R^2$ in B is n-butylene group; or $R^2$ in A is n-butylene group, and $R^2$ in B is n-hexylene group or n-decylene group; or $R^2$ in A is n-pentylene group, and $R^2$ in B is n-hexylene group; or $R^2$ in A is n-hexylene group, and $R^2$ in B is n-undecylene group or n-dodecylene group; or $R^2$ in A is n-undecylene group, and $R^2$ in B is n-dodecylene group.

m and n are each independently an integer from 1 to 46. m and n are preferably each independently an integer from 1 to 40, more preferably an integer from 1 to 30.

The ratio of m to n represents the ratio of groups A to B. m/n is not particularly limited, and is, for example, 0.01 or more and 30 or less, preferably 0.02 or more and 19 or less, more preferably 0.1 or more and 10 or less.

In the formula (1), $R^1$ is a linear, branched or cyclic alkylene group having 1 or more and 20 or less of (a) carbon atom(s). Note that, $R^1$ usually is a linear alkylene group, due to its production process, more specifically $R^2$ that corresponds A or B. The linear alkylene groups include the alkylene groups that are similar to those mentioned for A and B.

The branched alkylene groups are not particularly limited, and include, for example, 1-methylpropylene group, 2-methylpropylene group, 1,1-dimethylpropylene group, 1,2-dimethylpropylene group, 1,3-dimethylpropylene group, 2,2-dimethylpropylene group, 1,2,3-trimethylpropylene group, 1,1,2-trimethylpropylene group, 1,2,2-trimethylpropylene group, 1,1,3-trimethylpropylene group, 1-methylbutylene group, 2-methylbutylene group, 1,1-dimethylbutylene group, 1,2-dimethylbutylene group, 1,3-dimethylbutylene group, 1,4-dimethylbutylene group, 2,2-dimethylbutylene group, 2,3-dimethylbutylene group, 1,2,3-trimethylbutylene group, 1,2,4-trimethylbutylene group, 1,1,2-trimethylbutylene group, 1,2,2-trimethylbutylene group, 1,3,3-trimethylbutylene group, 1-methylpentylene group, 2-methylpentylene group, 3-methylpentylene group, 2-butyl-2-ethylpentylene group, 1-methylhexylene group, 2-methylhexylene group, 3-methylhexylene group, 1-methylheptylene group, 2-methylheptylene group, 3-methylheptylene group, 4-methylheptylene group, 1-methyloctylene group, 2-methyloctylene group, 3-methyloctylene group, 4-methyloctylene group, 1-methylnonylene group, 2-methylnonylene group, 3-methylnonylene group, 4-methylnonylene group, 5-methylnonylene group, 1-methyldecylene group, 2-methyldecylene group, 3-methyldecylene group, 4-methyldecylene group, and 5-methyldecylene group, and the like.

The cyclic alkylene groups are not particularly limited, but it can be a group having an alicyclic group such as, for example, a cyclopentane ring, cyclohexane ring, cycloheptane ring or cyclooctane ring. In this case, $R^2$ is bound to the adjacent oxygen group directly on the alicyclic group or via an alkylene group having 1 or more and 3 or less of (a) carbon atom(s) that has been substituted on the alicyclic group. Such cyclic alkylene group includes, for example, 1,4-cyclohexane-diyl bismethylene group.

The polycarbonate diol Y expressed by the formula (1) may also comprise a unit other than A and B. Such units include, for example, a unit based on an ester of a branched or cyclic alkylene glycol and a carbonic acid. The alkylene groups contained in such unit include a branched or cyclic alkylene group having 1 or more and 20 or less of (a) carbon atom(s), which has been listed for $R^1$ as mentioned above.

The sequence of the units including A and B in a polycarbonate diol Y expressed by the formula (1) is not particularly limited. That is, a polycarbonate diol Y may be either a random copolymer, an alternating copolymer or a block copolymer.

The number average molecular weight of the above-described polycarbonate diol Y is not particularly limited, though it can be, for example, from 250 to 4000 (inclusive), preferably from 500 to 3000 (inclusive). The number average molecular weight of polycarbonate diol can be calculated by, for example, measuring its hydroxyl value.

Specifically, first, the hydroxyl value of the polycarbonate diol Y is measured. The hydroxyl value of the polycarbonate diol Y can be measured in conformity to JIS K 1557-1:2007. On the other hand, the hydroxyl value of the polycarbonate diol Y (mgKOH/g) may also be expressed as the following formula I:

(the hydroxyl value of the polycarbonate diol Y (mgKOH/g))=56110/(the number average molecular weight of polycarbonate diol Y)×(the average number of hydroxyl groups per one molecule of the polycarbonate diol Y)    (I)

The average number of hydroxyl groups per one molecule of the polycarbonate diol Y is assumed to be 2.0. Accordingly, the number average molecular weight of the polycarbonate diol Y can be expressed as the following formula (II):

(the number average molecular weight of the polycarbonate diol Y)=112,220/(the hydroxyl value of the polycarbonate diol Y (mgKOH/g))    (II)

In the formula (II) above, the number average molecular weight of the polycarbonate diol Y is calculated by substituting the hydroxyl value of the polycarbonate diol Y obtained in the measurement of the hydroxyl value. Similar calculation may apply to other polycarbonate diol than the polycarbonate diol Y.

The amount of the combined polycarbonate diol Y described above is not particularly limited, though it is preferably from 10 mass % to 90 mass % (inclusive), more preferably from 20 mass % to 80 mass % (inclusive) against the total mass of the resin of the part in which the polycarbonate diol Y is used. This can further improve the strength of the shoe press belt 1 while suppressing the variation in strength among the parts of the shoe press belt 1. Note that the combined amount described above is the percentage against the amount of the resin in the resin 23 excluding inorganic fillers, which will be described later.

Hereinbelow, the components of the resin 23 which was formed by using the polycarbonate diol Y described above as the curing agent will be described. As mentioned above, the resin 23 comprises a polyurethane formed by curing an urethane prepolymer having an isocyanate group with a curing agent having an active hydrogen group, wherein the curing agent comprises the polycarbonate diol Y.

The urethane prepolymer having an isocyanate group is usually obtained by reacting a polyisocyanate compound with a polyol compound.

In this case, the polyisocyanate compound that constitutes the urethane prepolymer is not particularly limited, and, for example, one or more polyisocyanate compound(s) selected from an aromatic polyisocyanate and an aliphatic polyisocyanate may be used; preferably, a polyisocyanate compound comprising a compound selected from: 2,4-tolylene-diisocyanate (2,4-TDI), 2,6-tolylene-diisocyanate (2,6-TDI), 4,4'-methylene bis(phenyl isocyanate) (MDI), p-phenylene-diisocyanate (PPDI), dimethyl biphenylene diisocyanate (TODI), naphthalene-1,5-diisocyanate (NDI), 4,4-dibenzyldiisocyanate (DBDI), 1,6-hexamethylene diisocyanate (HDI), 1,5-pentamethylene diisocyanate, 1-isocyanate-3-isocyanate methyl-3,5,5-trimethylcyclohexane (IPDI), dicyclohexyl methane-4,4'-diisocyanate (H12MDI), xylylene diisocyanate (XDI), cyclohexane diisocyanate (CHDI), 1,4-bis(isocyanate methyl)cyclohexane (H6XDI) and tetramethylxylylene-diisocyanate (TMXDI), polymethylene polyphenyl polyisocyanate (Polymeric MDI), and a mixture thereof.

In order to further suppress the variation among the parts of the resulting resin 23, polyisocyanate compound particularly preferably comprises one or more selected from p-phenylene-diisocyanate, 4,4'-methylene bis(phenyl isocyanate), 1,4-bis(isocyanate methyl)cyclohexane and 2,4-tolylene-diisocyanate and 2,6-tolylene-diisocyanate.

The polyol compounds are not particularly limited and include, for example, polyester polyols such as polycaprolactone polyol, polyethylene adipate; polyether polyols such as polyethylene glycol, polyoxypropylene glycol, polyhexamethylene ether glycol, polytetramethylene ether glycol (PTMG); and linear aliphatic polycarbonate diol, polyether carbonate diol, trimethylolpropane, long-chain polyol compounds such as polybutadiene polyol, perfluoropolyether polyol, silicon polyols such as silicon diol, any one of which may be used alone, or more than one may be used in combination.

Linear aliphatic polycarbonate diols include such as, for example, polymethylene carbonate diol, polyethylene carbonate diol, polypropylene carbonate diol, polybutylene carbonate diol, polypentamethylene carbonate diol, polyhexamethylene carbonate diol, polyheptamethylene carbonate diol, and polyoctamethylene carbonate diol.

In order to increase hydrolysis resistance of the resin 23 and to further improve the durability of the shoe press belt 1, the polyol compound preferably comprises a polyether polyol and/or a linear aliphatic polycarbonate diol, more preferably polytetramethylene ether glycol and/or polyhexamethylene carbonate diol.

The curing agent having an active hydrogen group comprises, as mentioned above, a polycarbonate diol expressed by the formula (1). However, the curing agent may comprise other curing agent(s) than the polycarbonate diol expressed by the formula (1). Such curing agent is not particularly limited, and one or more compound(s) selected from the group consisting of polyol compounds and polyamines can be used.

As a polyol compound which can be contained in the curing agent, in addition to the long-chain polyol compounds mentioned above, various aliphatic polyol compounds and various alicyclic or aromatic polyol compounds may be used.

Aliphatic polyol compounds are not particularly limited and include, for example, alkylene glycol compounds such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,20-icosanediol, 2-methyl-1,3-propanediol, neopentylglycol, 2-butyl-2-ethyl-1,3-propanediol, 3-methyl-1,5-pentanediol, 2-ethyl-1,3-hexanediol and 2-methyl-1,8-octanediol, and glycerin, ditrimethylol propane, trimethylol propane (TMP), pentaerythritol and dihydroxymethyl propionic acid (DHPA), and the like.

Alicyclic polyol compounds are not particularly limited and include, for example, 1,4-cyclohexane dimethanol, hydrogenated bisphenol A, and the like.

Aromatic polyol compounds are not particularly limited and include, for example, hydroquinone bis-β-hydroxyethyl ether (HQEE), hydroxyphenyl ether resorcinol (HER), 1,3-bis(2-hydroxyethoxybenzene), 1,4-bis(2-hydroxyethoxybenzene), bisphenol A, an alkylene oxide adduct of bisphenol A, bisphenol S, an alkylene oxide adduct of bisphenol S, and the like.

Polyamines are not particularly limited and include hydrazine, ethylene diamine, 4,4'-methylene-bis-(2-chloroaniline) (MOCA), dimethylthiotoluene diamine (DMTDA), diethylthiotoluene diamine, diethyltoluene diamine (DETDA), trimethylene glycol di(p-aminobenzoate)(TMAB), 4,4'-methylene-bis-(3-chloro-2,6-diethylaniline)(MCDEA), 4,4'-methylene-bis-(2,6-diethylaniline) (MDEA), triisopropanolamine (TIPA), p-bis(aminocyclohexyl)methane (PACM), naphthalene-1,5-diamine, xylylene diamine, phenylene diamine, toluene-2,4-diamine, t-butyltoluene diamine, 1,2-bis(2-aminophenylthioethane), and the like.

When the curing agent comprises other curing agent(s) than the one or more polycarbonate diol(s) Y expressed by the formula (1), the proportion of the one or more polycarbonate diol(s) Y expressed by the formula (1) in the curing agent is, for example, 10 mass % or more and less than 100 mass %, preferably 50 mass % and more and 95 mass % or less.

Moreover, the resin 23 may comprise inorganic fillers such as titanium oxide, kaolin, clay, talc, diatomaceous earth, calcium carbonate, calcium silicate, magnesium silicate, silica and mica, which can be alone or in combination of two or more.

Note that, when the polyurethane resin formed by using the polycarbonate diol Y is contained either in the resin 33 of the second resin layer 30 or in the resin 13 of the reinforcing fibrous substrate layer 10, the first resin layer 20 do not have to comprise the aforementioned polyurethane resin. In this case, as ingredients of the resin 23 of the first resin layer 20, a thermosetting resin such as a polyurethane resin (note that it does not comprise polycarbonate diol Y as its component), an epoxy resin and acryl resin, or a thermoplastic resin such as polyamide, polyarylate and polyester, may be used alone or in combination of two or more.

As the resin 33 which constitutes the second resin layer 30, resin materials which can be used in the first resin layer 20 as mentioned above may be used alone or in combination of two or more. The resin 33 which constitutes the second resin layer 30 may be the same as or different from the resin 23 which constitutes the first resin layer 20 in the type and composition. In particular, from the perspective of improving the durability of the second resin layer 30 and of improving efficiency in resin production, it is preferred that the resin 33 is the same as the resin 23 of the first resin layer 20.

Moreover, the second resin layer 30 preferably comprises a polyurethane resin formed by using a curing agent comprising the polycarbonate diol Y. The second resin layer 30 constitutes the inner circumferential surface 31 of the shoe press belt 1. In the shoe press belt 1, the inner circumferential surface 31 is a part which is prone to being damaged (e.g., cracks) due to friction with the shoe upon using the shoe press belt 1 and bending fatigue of the shoe press belt 1. Accordingly, the durability of the shoe press belt 1 is improved by including a polyurethane resin formed by using a curing agent comprising the polycarbonate diol Y in the second resin layer 30 which constitute the inner circumferential surface 21 of the shoe press belt 1.

As the resin 13 which constitutes the reinforcing fibrous substrate layer 10, resin materials which can be used in the first resin layer 20 as mentioned above may be used alone or in combination of two or more. The resin 13 which constitutes the reinforcing fibrous substrate layer 10 may be the same as or different from the resin 23 which constitutes the first resin layer 20 in the type and composition. In particular, from the perspective of improving efficiency in resin production, the resin 13 which constitutes the reinforcing fibrous substrate layer 10 could be the same as the resin 23 of the first resin layer 20.

Moreover, the reinforcing fibrous substrate layer 10 preferably comprises a polyurethane resin formed by using a curing agent comprising the polycarbonate diol Y. This improves both the strength of the reinforcing fibrous substrate layer 10 and the durability of the shoe press belt 1.

The dimensions of the shoe press belt 1 as mentioned above are not particularly limited, and set as appropriate for its intended use.

For instance, the width of the shoe press belt 1 is not particularly limited, though it may be set to between 700 mm and 13500 mm, preferably between 2500 mm and 12500 mm.

Moreover, for example, the length (circumference) of the shoe press belt 1 is not particularly limited, though it may be set to between 150 cm and 1500 cm, preferably between 200 cm and 1100 cm.

Moreover, the thickness of the shoe press belt 1 is not particularly limited, though it may be set to be, for example, between 1.5 mm and 7.0 mm, preferably between 2.0 mm and 6.0 mm.

Moreover, the thickness of the shoe press belt 1 may be different for each part, or it may be the same.

As above, in the shoe press belt 1 according to the present embodiments, at least any one of the resin 13 of the reinforcing fibrous substrate layer 10, the resin 23 of the first resin layer 20, and the resin 33 of the second resin layer 30 comprises a polyurethane resin formed by using a curing agent comprising the polycarbonate diol Y. Accordingly, the shoe press belt 1 has suppressed variation in strength among the parts and is excellent in strength.

Figure 2:
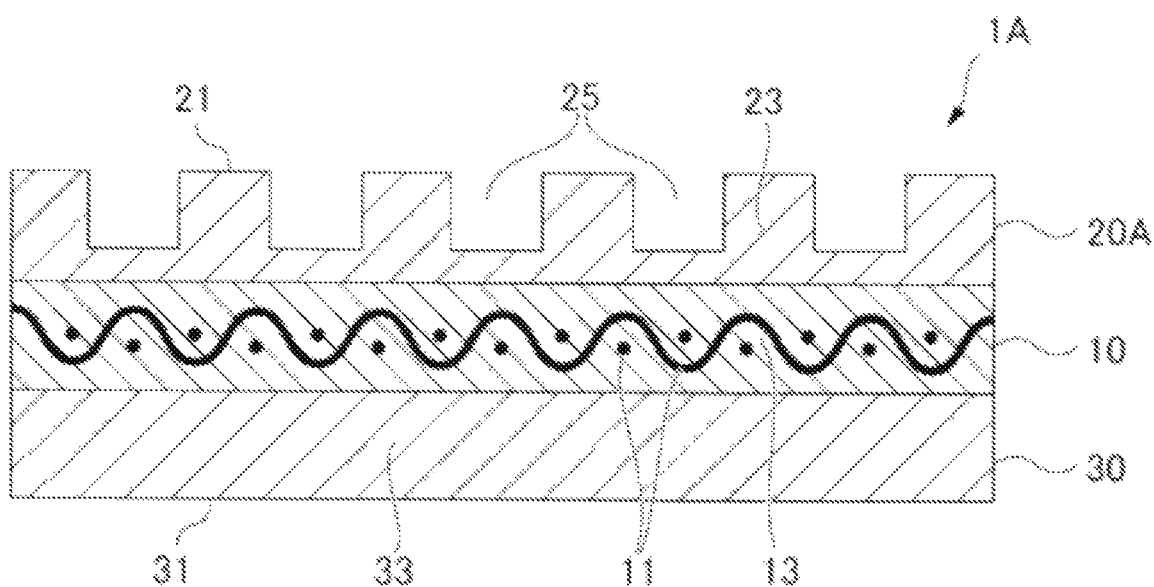
FIG. 2 is a cross-sectional view in a cross machine direction showing a shoe press belt according to another embodiment of the present invention.

Next, shoe press belts according to other embodiments of the present embodiments will be described. FIG. 2 is a cross-sectional view in a cross machine direction showing a shoe press belt according to another embodiment of the present invention. Hereinbelow, the differences from the aforementioned embodiments will be principally described, while cutting description about similar matters.

As shown in FIG. 2, the shoe press belt 1A has multiple drains 25 formed on the outer circumferential surface 21 of the first resin layer 20A. Because the shoe press belt 1A has the drains 25, more moisture can be dehydrated from the supported wet paper web upon using the shoe press belt 1A.

The configuration of the drain 25 is not particularly limited, though, in general, multiple continuous drains are formed in parallel in the machine direction of the shoe press belt 1A. For instance, the groove width may be set to between 0.5 mm and 2.0 mm, the groove depth between 0.4 mm and 2.0 mm, and the number of drains between 5 and 20 drains/inch. Moreover, the cross-sectional shape of the drain 25 may be set as appropriate, such as a rectangle, trapezoidal, U-shaped, or it may be set such that the parts where the land and groove bottom are met with the groove wall are rounded.

Moreover, the configurations of these drains 25 may be the same for the groove width and depth, the number of drains and the cross-sectional shape, or the drains of different configurations may be combined. Furthermore, these drains 25 may be formed as discontinuous bodies, or may be formed as multiple drains which are arranged in parallel to the cross machine direction.

As above, in the shoe press belt 1A according to the present embodiment, too, at least any one of the resin 13 of the reinforcing fibrous substrate layer 10, the resin 23 of the first resin layer 20A, the resin 33 of the second resin layer 30 comprises a polyurethane resin formed by using a curing agent comprising the polycarbonate diol Y. Accordingly, the shoe press belt 1A has suppressed variation in strength among the parts, and is excellent in strength.

<2. Method for Producing a Shoe Press Belt>

Figure 3:
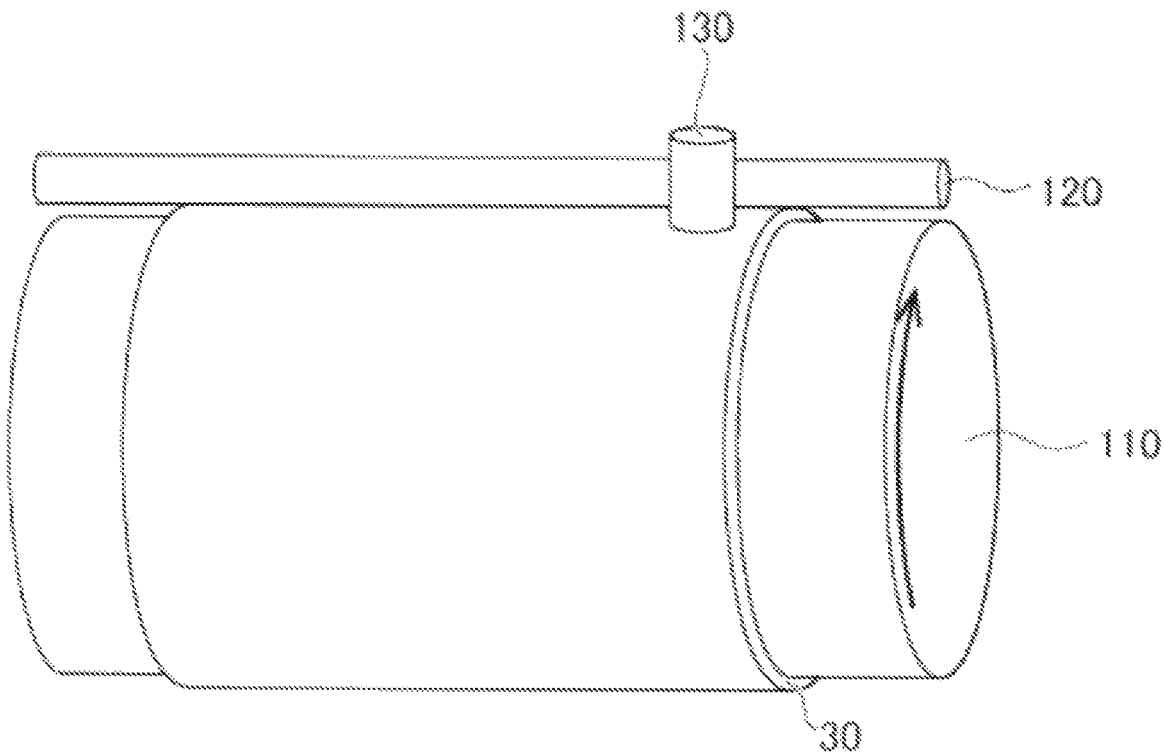
FIG. 3 is a schematic diagram for illustrating a preferred embodiment of a method of producing a shoe press belt according to the present invention.
Figure 4:
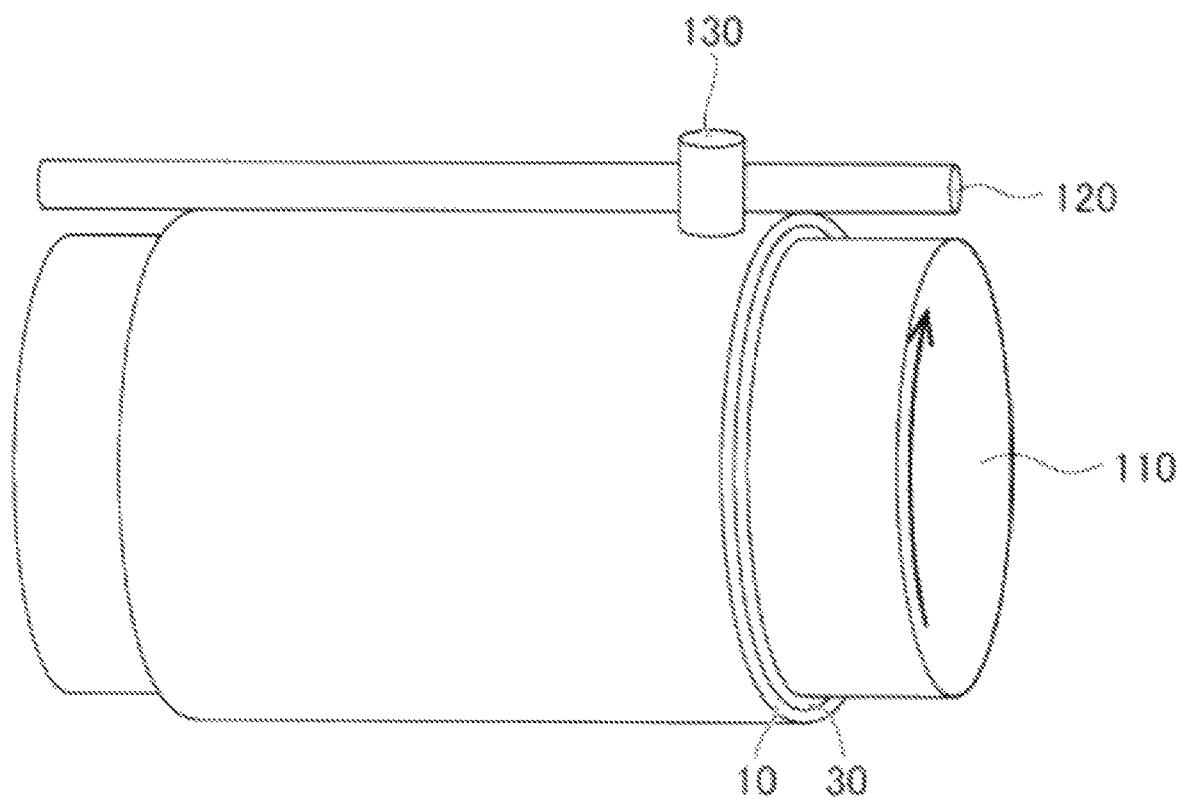
FIG. 4 is a schematic diagram for illustrating a preferred embodiment of a method of producing a shoe press belt according to the present invention.
Figure 5:
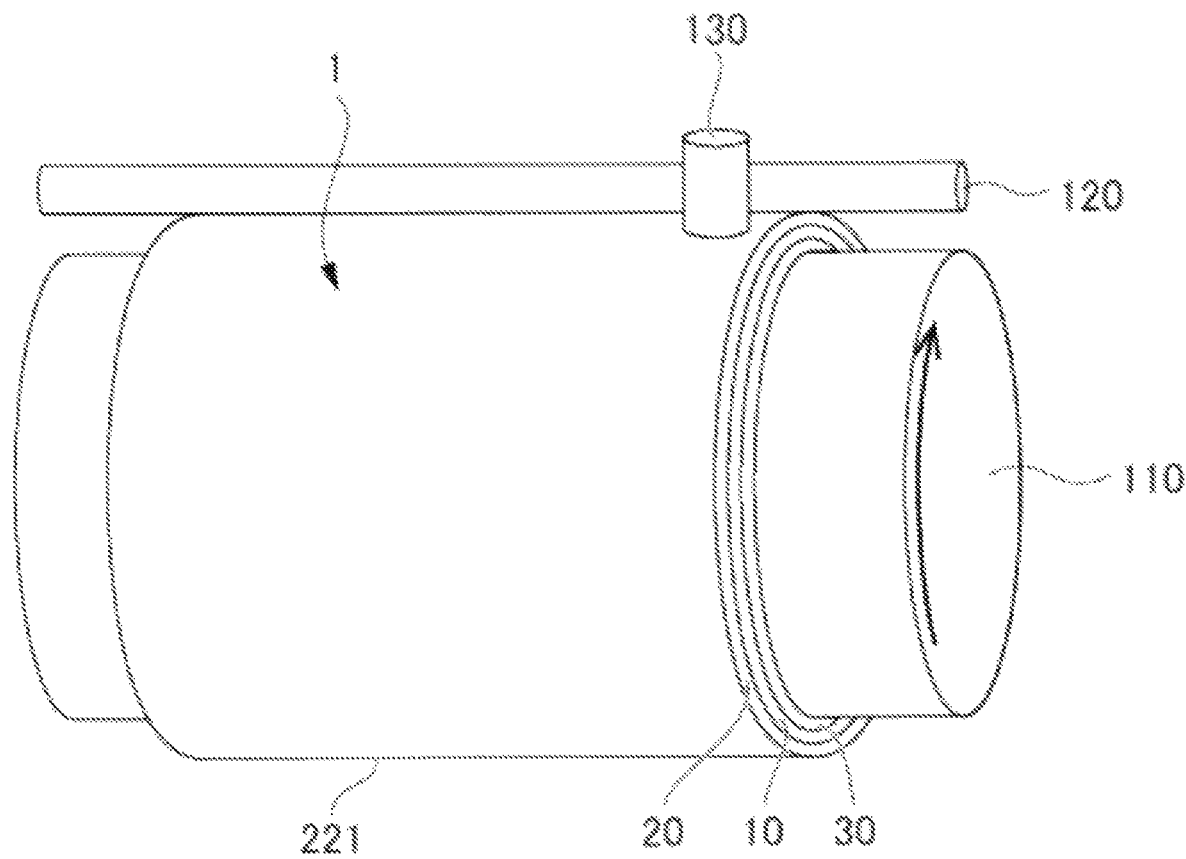
FIG. 5 is a schematic diagram for illustrating a preferred embodiment of a method of producing a shoe press belt according to the present invention.

Next, preferred embodiments of a method for producing a shoe press belt of the present invention will be described. FIGS. 3 to 5 are schematic drawings illustrating the preferred embodiments of the method for producing the shoe press belt.

The method for producing the shoe press belt according to the present invention is a method for producing a shoe press belt for use in a papermaking machine, comprising a step of forming a resin layer by curing an urethane prepolymer having an isocyanate group with a curing agent having an active hydrogen group, wherein:

the curing agent comprises one or more polycarbonate diol(s) Y expressed by the following formula (1):

$$\text{HO-}A_m\text{-}B_n\text{—}R^1\text{OH} \quad (1)$$

wherein:
in the formula (1),
A and B are each differently a unit expressed by the following formula (2):

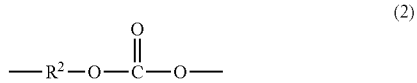

$$\text{—}R^2\text{—O—}\overset{\overset{\displaystyle O}{\|}}{C}\text{—O—} \quad (2)$$

$R^1$ is a linear, branched or cyclic alkylene group having 1 or more and 20 or less of (a) carbon atom(s), m and n are each independently an integer from 1 to 46, and in the formula (2), $R^2$ is a linear alkylene group having 1 or more and 20 or less of (a) carbon atom(s).

Further, a method for producing a shoe press belt according to one embodiment of the present invention comprises a step of forming a resin layer which forms a first resin layer 20, a reinforcing fibrous substrate layer 10, and a second resin layer 30.

In the step of forming a resin layer, a resin layer is formed. In this step, specifically, a laminated body is formed, which has the reinforcing fibrous substrate layer 10, in which annular and band-shaped reinforcing fibrous substrate 11 is embedded in the resin 13, and the first resin layer 20 and the second resin layer 30 laminated on both sides of the reinforcing fibrous substrate layer 10 as resin layers.

The formation of such laminated body can be made by any method, though, in the present embodiment, first, the second resin layer 30 is formed. Next, the reinforcing fibrous substrate 11 is disposed on one surface of the second resin layer 30, and a resin material is applied onto the reinforcing fibrous substrate 11 and allowed to be impregnated and penetrated in it to form a laminated body in which the reinforcing fibrous substrate layer 10 and the second resin layer 30 are integrated. Then, the first resin layer 20 is formed on the surface of the reinforcing fibrous substrate layer 10 which is orientated opposite to the bonding plane of the reinforcing fibrous substrate layer 10 and the second resin layer 30.

Specifically, for example, first, as shown in FIG. 3, a resin material is applied to the surface of the mandrel 110 on which a release agent has been applied, while rotating the mandrel 110, such that the thickness of the resin will be from 0.8 to 3.5 mm. This forms a resin precursor layer that is to be the second resin layer 30. Then, the temperature of the resin precursor layer is risen to between 40 and 140° C., pre-cured it for 0.5 to 1 hour to form the second resin layer 30.

Then, the reinforcing fibrous substrate 11 is disposed onto the pre-cured second resin layer 30 (not illustrated), and, as shown in FIG. 4, while rotating the mandrel 110, a resin material which will form the reinforcing fibrous substrate layer 10 is applied in 0.5 to 2.0 mm, allowed to be impregnated and penetrated in the reinforcing fibrous substrate, and at the same time bonded to the second resin layer 30 to form a laminated body in which the reinforcing fibrous substrate layer 10 and the second resin layer 30 are integrated.

Thereafter, as shown in FIG. 5, while rotating the mandrel 110, a resin material which will form the first resin layer 20 is applied onto the surface of the reinforcing fibrous substrate layer 10 described above and allowed to be impregnated in it to form a resin precursor layer of thickness of 1.5 to 4 mm, which is to be the first resin layer 20. Then, the resin precursor layer is heated and cured at 70 to 140° C. for 2 to 20 hours to form a laminated body in which the first resin layer 20, the reinforcing fibrous substrate layer 10, and the second resin layer 30 are laminated.

Besides, the application of the resin material may be done by any method, though, in the present embodiment, this is done by discharging the resin material from the injection molding nozzle 130, while rotating the mandrel 110, and at the same time uniformly applying the provided resin material using a coater bar 120.

Here, in at least any one of the resin 13 of the reinforcing fibrous substrate layer 10, the resin 23 of the first resin layer 20, and the resin 33 of the second resin layer 30, a polyurethane resin is formed using a curing agent comprising the polycarbonate diol Y expressed by the above-described formula (1). As mentioned above, by using the curing agent comprising the polycarbonate diol Y, the increase in viscosity of the urethane composition (resin material) can be suppressed. Accordingly, it is possible to form a uniform polyurethane resin layer.

Moreover, heating method is not particularly limited, though, for example, methods using far-infrared heater, etc. may be used.

The obtained laminated body goes through polishing or buff processing or as appropriate for the outer circumferential surface 21 and the inner circumferential surface 31, the ends of width direction are cut as appropriate and cleaned up, to provide the shoe press belt 1. The shoe press belt 1 is produced as above.

Moreover, when the shoe press belt 1A is to be produced, for a laminated body formed in the aforementioned resin layer-forming step, the drains 25 may be formed on the outer circumferential surface 21 as follows.

The formation of such drains 25 can be done by any method, though, for example, the drains 25 may be formed by: polishing/buff-processing the outer surface of the laminated body obtained as above to achieve the desired thickness of the shoe press belt 1 (not illustrated), then, while rotating the mandrel 110, bringing a grooving device to which multiple disk-like rotary blades into contact with the outer circumferential surface 21.

The method for producing the shoe press belt in the above-described embodiment has been described as mandrel (one-roll) production method. However, as another embodiment, a two-roll production method as described below can also be employed. First, an annular reinforcing fibrous substrate 11 is hung over two rolls placed in parallel, and a resin is applied onto this reinforcing fibrous substrate 11, impregnated and laminated to form the second resin layer 30 with the reinforcing fibrous substrate layer 10. Then, this is turned over, and the first resin layer 20 is formed on the surface of the inverted reinforcing fibrous substrate layer 10. This provides the shoe press belt 1. Besides, the order of formation of each resin layer may be optional.

Hereinabove, the present invention has been described on the basis of the preferred embodiment in detail. However, the present invention is not limited thereto, and it is possible to replace each configuration with an arbitrary configuration that can exert a similar function or add an arbitrary configuration.

Example

Hereinafter, the present invention will be described more specifically on the basis of examples. However, the present invention is not limited to those examples.

1. Production of Shoe Press Belt and Polyurethane Sheet Test Piece

Prior to producing shoe press belts, first, we prepared polycarbonate diols indicated in Table 1, polytetramethylene ether glycols indicated in Table 2, and resin materials (urethane compositions) of the compositions of Examples 1-5 and Comparative Examples 1-4 indicated in Table 3 obtained using these polycarbonate diols and the polytetramethylene ether glycols. Note that, for all resin materials, the urethane prepolymer and the curing agent were combined such that the combination ratio would be [H]/[NCO] ratio=0.95.

Next, shoe press belts were prepared according to the following method using the resin materials of Examples 1-5 and Comparative Examples 1-4.

To a surface of a mandrel having a diameter of 1500 mm and rotatable by any appropriate driving means, a resin material of either of Examples 1-5 and Comparative Examples 1-4 was applied to 1.4 mm thick while rotating the mandrel, using an injection molding nozzle that is capable of running parallel to the rotary shaft of the mandrel. This formed an uncured shoe-side resin layer (second resin layer). Then, the mandrel was left being rotated at a room temperature for 10 minutes, heated to 140° C. by a heating device attached to the mandrel, and pre-cured at 140° C. for 1 hour.

Next, a grid-like web material that consists of warps interposed between weft yarns where the intersection of a weft yarn and a warp was joined with urethane-type resin adhesive was placed in one layer on the outer circumferential surface of the shoe-side resin layer such that weft yarns are arranged along the shaft of the mandrel leaving no space. Here, the weft yarn of the grid-like web material is multifilament twist yarn of polyethylene terephthalate fiber of 5000 dtex, whereas the warp is multifilament yarn of polyethylene terephthalate fiber of 550 dtex. The warp density was set to 1 yarn/cm, whereas weft yarn density was set to 4 yarns/cm.

Next, a yarn wound layer was formed by helicoidally winding multifilament yarns of polyethylene terephthalate fiber of 6700 dtex around on the circumference of this grid-like web material with a pitch of 30 yarns/5 cm, and the grid-like web material and yarn wound layer together formed a reinforcing fibrous substrate. Then, the resin material same as that of the shoe-side resin layer (resin materials of Examples 1-5 and Comparative Examples 1-4) was applied so as to close gaps in the reinforcing fibrous substrate, forming a laminated body in which the reinforcing fibrous substrate layer and the shoe-side resin layer are integrated.

Next, over the reinforcing fibrous substrate layer, while rotating the mandrel, the resin material same as those of the reinforcing fibrous substrate layer and shoe-side resin layer (resin materials of Examples 1-5 and Comparative Examples 1-4) was applied to about 2.5 mm thick using an injection molding nozzle that is capable of running parallel to the rotating shaft of the mandrel to form an uncured felt-side resin layer (first resin layer).

Then, this was left at room temperature for 40 minutes while keeping the mandrel being rotated, further heated to 140° C. with heating equipment attached to the mandrel, and each resin layer was thermally cured at 140° C. for 4 hours. This formed a laminated body in which the felt-side resin layer, the reinforcing fibrous substrate layer, and the shoe-side resin layer are integrated.

Subsequently, the felt-contact surface of the felt-side resin layer was polished such that the total thickness would be 5.2 mm to give a laminated body.

After the steps above, shoe press belts according to Examples 1-5 and Comparative Examples 1-4 were obtained. An evaluation of hardness was performed for the obtained shoe press belts. Moreover, in order to evaluate the breaking strength and variation in tensile testing, test pieces of 1.0 mm thick polyurethane sheet were cut out from arbitrary 20 positions of the felt-side resin layer.

2. Evaluation 2.1 Prepolymer Viscosity

For prepolymers used for resin materials of Examples 1-5 and Comparative Examples 1-4, viscosity was measured. The viscosity of prepolymers at temperatures 50 and 80° C. were measured using a B-type viscometer (TOKI SANGYO Co., Ltd., Product name: TVB-10H). The rotor used was H3 rotor, and the measurement was performed at rotational speed of 50 rpm for the cases of 200 to 2,000 mPa·s, 5 rpm for the cases of 2,000 to 20,000 mPa·s.

2.2 Evaluation of Hardness

Hardness was measured for the outer circumferential surfaces of the shoe press belts according to Examples 1-5 and Comparative Examples 1-4. Specifically, the surface hardness of the felt-side resin layers was measured in conformity to JIS K 6301:1995 and using an A-type, spring-type hardness tester.

2.3 Evaluation of Breaking Strength in Tensile Testing

The breaking strength was measured using a universal tensile testing machine as the testing machine and a test piece of dumbbell-No. 3-shape defined in JIS K 6251 for the sample shape, at tension rate of 500 mm/min, and evaluated as stress (MPa) at the time of breaking of the test piece.

Twenty measurements were made for each Example/Comparative Example, and the average value was presented.

2.4 Evaluation of Variation in Breaking Strength

The variation in the breaking strength was evaluated by calculated standard deviations (SDs) for 20 measurements of the breaking strength in the tensile testing.

Table 3 shows the results of the above evaluations along with the compositions of the resin materials of Examples 1-5 and Comparative Examples 1-4, etc. In Table 3, "MDI" indicates 4,4'-methylene bis(phenyl isocyanate), "PPDI" indicates p-phenylene-diisocyanate, "H6XDI" indicates 1,4-bis(isocyanate methyl)cyclohexane, "TDI" indicates the mixture of 2,4-tolylene-diisocyanate and 2,6-tolylene-diisocyanate, "BD" indicates 1,4-butanediol, and "DMTDA" indicates dimethylthiotoluene diamine, respectively.

Moreover, the number average molecular weight of the polycarbonate diol in Table 1 was calculated by measuring the hydroxyl value for each polycarbonate diol and calculating the number average molecular weight by the formula (II) described above based on the obtained hydroxyl value. The same applies to polytetramethylene ether glycols in Table 2. Furthermore, for polycarbonate diols PCD1 to PCD3 and PCD6 in Table 1, the number of each diol constituent per one molecule was calculated to be 30 or less, based on the obtained number average molecular weight and the quantity ratio of diol constituents.

TABLE 1

| Polycarbonate Diol | Diol Constituents | | Diol 1/ Diol 2 (mol/mol) | Number Average Molecular Weight | Hydroxyl Value (mg KOH/g) |
| --- | --- | --- | --- | --- | --- |
| | Diol 1 | Diol 2 | | | |
| PCD1 | 1,4-butanediol | 1,6-hexanediol | 70/30 | 1,010 | 111.1 |
| PCD2 | 1,6-hexanediol | 1,5-pentanediol | 50/50 | 1,983 | 56.6 |
| PCD3 | 1,3-propanediol | 1,4-butanediol | 50/50 | 819 | 137.0 |
| PCD4 | 1,6-hexanediol | — | 100/0 | 1,002 | 112.0 |
| PCD5 | 1,6-hexanediol | — | 100/0 | 2,074 | 54.1 |
| PCD6 | 1,6-hexanediol | 1,5-pentanediol | 50/50 | 1,009 | 111.2 |

TABLE 2

| Polytetramethylene Ether Glycol | Number Average Molecular Weight | Hydroxyl Value (mg KOH/g) |
| --- | --- | --- |
| PTMG1 | 648 | 173.1 |
| PTMG2 | 1,039 | 108.0 |

TABLE 3

| | | | Example 1 | Example 2 | Example 3 | Example 4 | Example 5 | Comparative Example 1 | Comparative Example 2 | Comparative Example 3 | Comparative Example 4 |
| --- | --- | --- | --- | --- | --- | --- | --- | --- | --- | --- | --- |
| Resin material | Prepolymer | Type of isocyanate compound | MDI | MDI | PPDI | MDI | H6XDI | MDI | PPDI | TDI | MDI |
| | | Type of polyol compound | PTMG2 | PTMG2 | PTMG1 44.7% PTMG2 55.3% | PCD4 | PTMG2 | PCD4 | PCD5 | PTMG2 | PCG2 45.6% PCD6 54.4% |
| | | Proportion of PCD in polyol compound (mass %) | 0 | 0 | 0 | 100 | 0 | 100 | 100 | 0 | 100 |
| | | NCO % | 16.48 | 12.30 | 7.38 | 16.78 | 10.36 | 9.06 | 3.51 | 6.06 | 8.83 |
| | Curing agent | Type | BD PCD1 | BD PCD2 | BD PCD3 | BD PCD1 | BD PCD3 | BD | BD | DMATDA | BD |
| | | Proportion of PCD in curing agent (mass %) | 74 | 59 | 87 | 77 | 68 | 0 | 0 | 0 | 0 |
| | | PCD content in polyurethane (mass %) | 25 | 13 | 22 | 53 | 14 | 53 | 84 | 0 | 58 |
| Evaluation | Prepolymer viscosity (mPa·s) | @ 50° C. | 1,590 | 1,700 | 1,840 | 1,650 | 1,200 | solid | solid | 1,900 | 28,000 |
| | | @ 80° C. | 310 | 350 | 380 | 340 | 410 | 5,000 | 6,000 | 440 | 5,000 |
| | Hardness (JIS A) | | 95 | 95 | 85 | 95 | 95 | 95 | 95 | 95 | 95 |
| | Tensile testing breaking strength (Mpa) | Mean Value | 48.2 | 42.0 | 43.6 | 44.1 | 41.6 | 35.1 | 36.9 | 30.8 | 42.2 |
| | | SD | 1.4 | 2.3 | 1.7 | 2.4 | 1.8 | 3.6 | 5.7 | 1.1 | 3.2 |

As shown in Table 3, the shoe press belts according to Examples 1-5 have suppressed variation in strength among their parts and further were better in strength as compared to the shoe press belts according to Comparative Examples 1, 2 and 4. In the shoe press belts according to Comparative Example 3 in which no polycarbonate was used, the variation in strength between parts was suppressed, though the strength was considerably low as compared to the shoe press belts according to Examples 1-5.

In Example 4, a linear aliphatic polycarbonate containing single diol component was used in the urethane prepolymer. In this case, the crystallinity of the linear aliphatic polycarbonate diol itself is increased, and the viscosity of the urethane prepolymer tends to be high. However, even in such case, it is possible to reduce the viscosity of the urethane prepolymer by setting high NCO %. Nevertheless, if only 1,4-butanediol is used as the curing agent, affinity between the molecules which constitute the curing agent and the urethane prepolymer will be too high, which leads to an increase in viscosity of the urethane compound even if a high NCO % had been set. In Example 4, however, the affinity between the molecules which constitute the curing agent and the urethane prepolymer could reduced by using the polycarbonate diol expressed by the formula (1) as the curing agent. As a result, it was possible to suppress variation in strength between parts while improving the strength.

Moreover, the shoe press belt according to Comparative Example 4 in which more than one linear aliphatic polycarbonate diols were used was excellent in strength though it had large variation in strength among the parts. Because of this, the shoe press belt of Comparative Example 4 is likely to be broken, starting from a part with weak strength. That is, the durability of the shoe press belt was failed to be improved.

REFERENCE SIGNS LIST 1, 1A Shoe press belt
10 Reinforcing fibrous substrate layer
11 Reinforcing fibrous substrate
13 Resin
20, 20A First resin layer
21 Outer circumferential surface
23 Resin
25 Drains
30 Second resin layer
31 Inner circumferential surface
33 Resin

What is claimed is:

1. A shoe press belt for use in a papermaking machine, comprising at least one resin layer, wherein:
    the resin layer comprises a polyurethane resin formed by curing an urethane prepolymer having an isocyanate group with a curing agent having an active hydrogen group, wherein:
    the curing agent is free of a polyamine compound and consists of one or more polyol(s) comprising one or more polycarbonate diol(s) expressed by the following formula (1):

$$HO-A_m-B_n-R^1OH \qquad (1)$$

wherein:
    in the formula (1),
        A and B are each differently a unit expressed by the following formula (2):

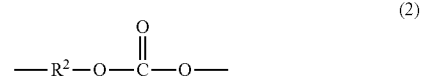

$R^1$ is a linear, branched or cyclic alkylene group having 1 or more and 20 or less of (a) carbon atom(s),
        m and n are each independently an integer from 1 to 46, and
    in the formula (2),
        $R^2$ is a linear alkylene group having 1 or more and 20 or less of (a) carbon atom(s), and wherein:
    the polyurethane resin has a higher breaking strength as compared to a comparative polyurethane resin formed by curing the urethane prepolymer with a curing agent comprising a polyamine compound.

2. The shoe press belt according to claim 1, wherein the absolute difference between the number of carbon atoms contained in A and the number of carbon atoms contained in B in the formula (1) is 1 or more and 8 or less.

3. The shoe press belt according to claim 1, wherein the number of carbon atoms of $R^2$ in A is 2 or more and 11 or less, and the number of carbon atoms of $R^2$ in B is 3 or more and 19 or less.

4. The shoe press belt according to claim 1, wherein:
    $R^2$ in A is n-propylene group, and $R^2$ in B is n-butylene group; or
    $R^2$ in A is n-butylene group, and $R^2$ in B is n-hexylene group or n-decylene group; or
    $R^2$ in A is n-pentylene group, and $R^2$ in B is n-hexylene group; or
    $R^2$ in A is n-hexylene group, and $R^2$ in B is n-undecylene group or n-dodecylene group; or
    $R^2$ in A is n-undecylene group, and $R^2$ in B is n-dodecylene group.

5. The shoe press belt according to claim 1, comprising as the resin layer a layer which constitutes an outer circumferential surface of the shoe press belt and comprises the polyurethane resin.

6. The shoe press belt according to claim 1, comprising as the resin layer a layer which constitutes the inner circumferential surface of theshoe press belt and comprises the polyurethane resin.

7. A method for producing a shoe press belt for use in a papermaking machine, the method comprising:
    forming a resin layer comprising a polyurethane resin by curing an urethane prepolymer having an isocyanate group with a curing agent having an active hydrogen group,
    wherein:
    the curing agent is free of a polyamine compound and consists of one or more polyol(s) comprising one or more polycarbonate diol(s) expressed by the following formula (1):

$$HO-A_m-B_n-R^1OH \qquad (1)$$

wherein:

in the formula (1),

A and B are each differently a unit expressed by the following formula (2):

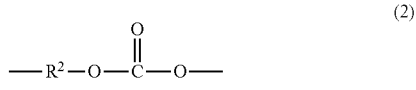 (2)

$R^1$ is a linear, branched or cyclic alkylene group having 1 or more and 20 or less of (a) carbon atom(s), m and n are each independently an integer from 1 to 46, and in the formula (2), $R^2$ is a linear alkylene group having 1 or more and 20 or less of (a) carbon atom(s), and wherein:

the polyurethane resin has a higher breaking strength as compared to a comparative polyurethane resin formed by curing the urethane prepolymer with a curing agent comprising a polyamine compound.

8. The shoe press belt according to claim 1, wherein the urethane prepolymer does not comprise a polycarbonate diol.

9. The shoe press belt according to claim 1, wherein the urethane prepolymer is formed by reacting at least one polyisocyanate compound with at least one polyol compound.

10. The shoe press belt according to claim 1, wherein the urethane prepolymer is formed by reacting at least one polyisocyanate compound with at least two polyol compounds.

11. The shoe press belt according to claim 9, wherein the at least one polyol compound does not comprise a linear aliphatic polycarbonate diol.

* * * * *